(12) United States Patent
Uchino et al.

(10) Patent No.: US 10,805,904 B2
(45) Date of Patent: Oct. 13, 2020

(54) INFORMATION NOTIFICATION METHOD, MOBILE COMMUNICATION SYSTEM AND BASE STATION

(71) Applicant: NTT DOCOMO, INC., Tokyo (JP)

(72) Inventors: Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 67 days.

(21) Appl. No.: 15/304,901

(22) PCT Filed: Oct. 1, 2015

(86) PCT No.: PCT/JP2015/077969
§ 371 (c)(1),
(2) Date: Oct. 18, 2016

(87) PCT Pub. No.: WO2016/052708
PCT Pub. Date: Apr. 7, 2016

(65) Prior Publication Data
US 2017/0188335 A1    Jun. 29, 2017

(30) Foreign Application Priority Data
Oct. 3, 2014    (JP) .................................. 2014-205020

(51) Int. Cl.
*H04W 72/04* (2009.01)
*H04W 92/20* (2009.01)
*H04L 12/24* (2006.01)

(52) U.S. Cl.
CPC ......... *H04W 72/04* (2013.01); *H04L 41/0813* (2013.01); *H04W 72/0426* (2013.01); *H04W 92/20* (2013.01)

(58) Field of Classification Search
None
See application file for complete search history.

(56) References Cited

U.S. PATENT DOCUMENTS

2017/0150405 A1*   5/2017   Chiba ............... H04W 36/0038
2017/0181216 A1*   6/2017   Worrall ................ H04W 76/19
(Continued)

OTHER PUBLICATIONS

3GPP TSG RAN WG2 83 R2-132622; Samsung; Aug. 19-23, 2013; (IDS art) (Year: 2013).*
"3GPP TSG RAN WG2 83 R2-132622"; Samsung; Aug. 19-23, 2013 (Year: 2013).*
International Search Report issued in PCT/JP2015/077969, dated Dec. 22, 2015 (2 pages).
(Continued)

*Primary Examiner* — Scott M Sciacca
(74) *Attorney, Agent, or Firm* — Osha Liang LLP

(57) ABSTRACT

An information notification method in a mobile communication system including a first base station and a second base station that perform communication with a user apparatus by inter-base station carrier aggregation, including a step in which the first base station notifies the second base station of a configuration change request including first desired setting information; a step in which the second base station notifies the first base station of second desired setting information; a step in which the first base station determines first setting information and second setting information to be set to the user apparatus, and notifies the user apparatus of the first setting information and the second setting information; and a step of, after completion of setting of the first setting information and the second setting information to the user apparatus, notifying the second base station of information on the setting.

4 Claims, 8 Drawing Sheets

(56) References Cited

U.S. PATENT DOCUMENTS

2017/0195935 A1* 7/2017 Xu .................. H04W 36/30
2017/0222876 A1* 8/2017 Van Der Velde ..........................
                                                    H04W 36/0055
2017/0311212 A1* 10/2017 Yamada ............ H04W 36/0072

OTHER PUBLICATIONS

Written Opinion of the International Searching Authority issued in PCT/JP2015/077969, dated Dec. 22, 2015 (4 pages).
3GPP TR 36.842 V12.0.0; "3rd Generation Partnership Project; Technical Specification Group Radio Access Network; Study on Small Cell enhancements for E-UTRA and E-UTRAN; Higher layer aspects; (Release 12)"; Dec. 2013 (71 pages).
NTT DOCOMO, Inc,; "Introduction of Dual Connectivity"; 3GPP TSG-RAN WG2 #87, R2-143417; Dresden, Germany; Aug. 18-22, 2014 (63 pages).
Japanese Office Action for corresponding Japanese Application No. 2016-005586 dated Sep. 30, 2016 (6 pages).
Samsung; "Details on CP Architecture: Option 1"; 3GPP TSG RAN WG2 #83, R2-132622; Barcelona, Spain; Aug. 19-23, 2013 (5 pages).
Japanese Office Action w/translation for corresponding Japanese Application No. 2016-005586 dated Sep. 27, 2016 (6 pages).
Extended European Search Report issued in corresponding European Patent Application No. 15846857.9 (12 pages).
Ericsson, "Inter-node RRC messages for dual connectivity", 3GPP TSG-RAN WG2 #86, TDOC R2-142405, Seoul, South Korea, May 19-23, 2014 (7 pages).
NTT Docomo, Inc., "CG configuration in SCG-ConfigInfo", 3GPP TSG-RAN WG2 #87bis, R2-144583, Shanghai China, Oct. 6-10, 2014 (3 pages).
Office Action issued in the counterpart European Patent Application No. 15846857.9, dated Oct. 4, 2018 (6 Pages).
Office Action issued in the counterpart Chinese Patent Application No. 201580025949.X, dated Aug. 9, 2018 (11 pages).

* cited by examiner

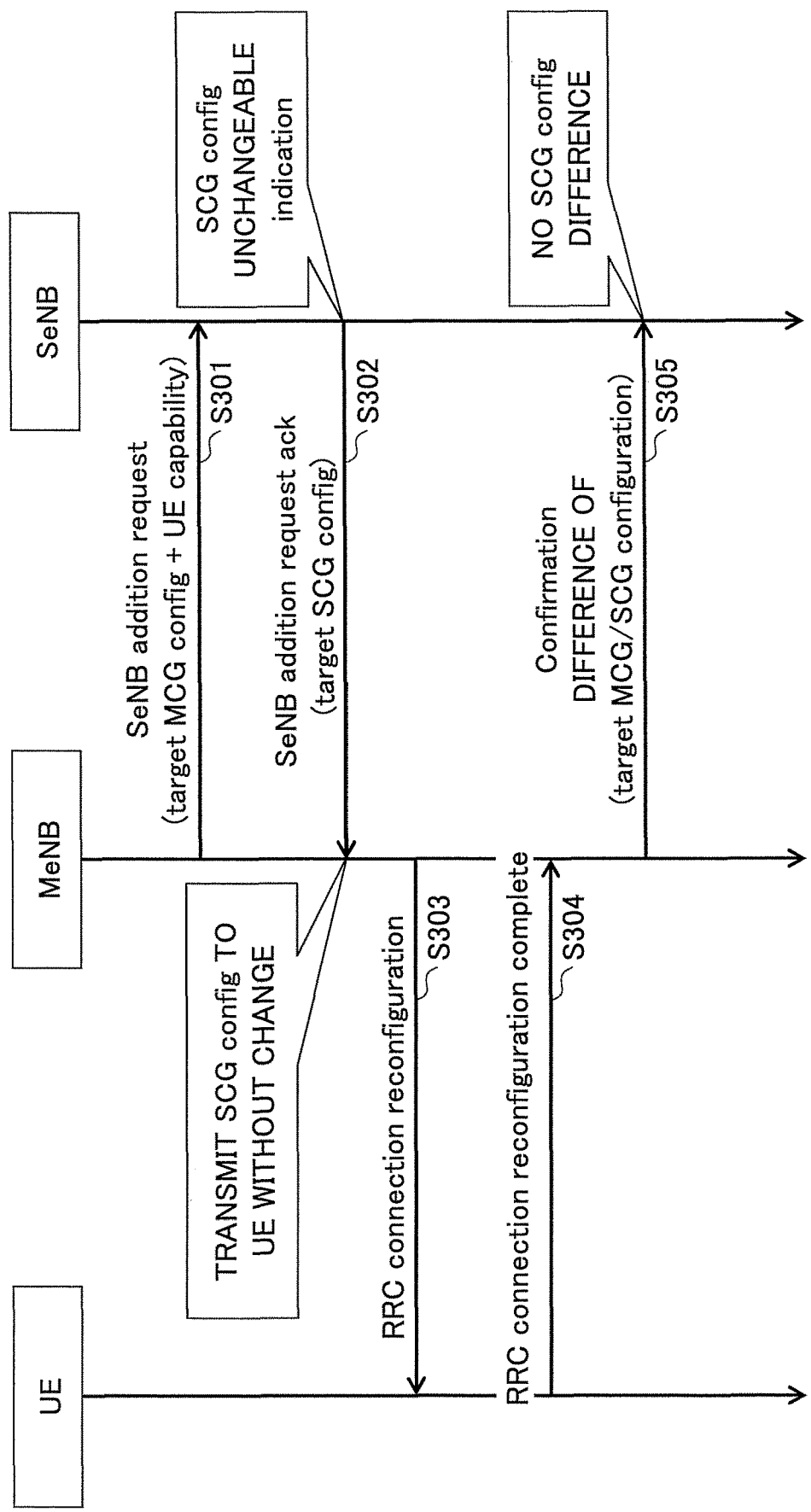

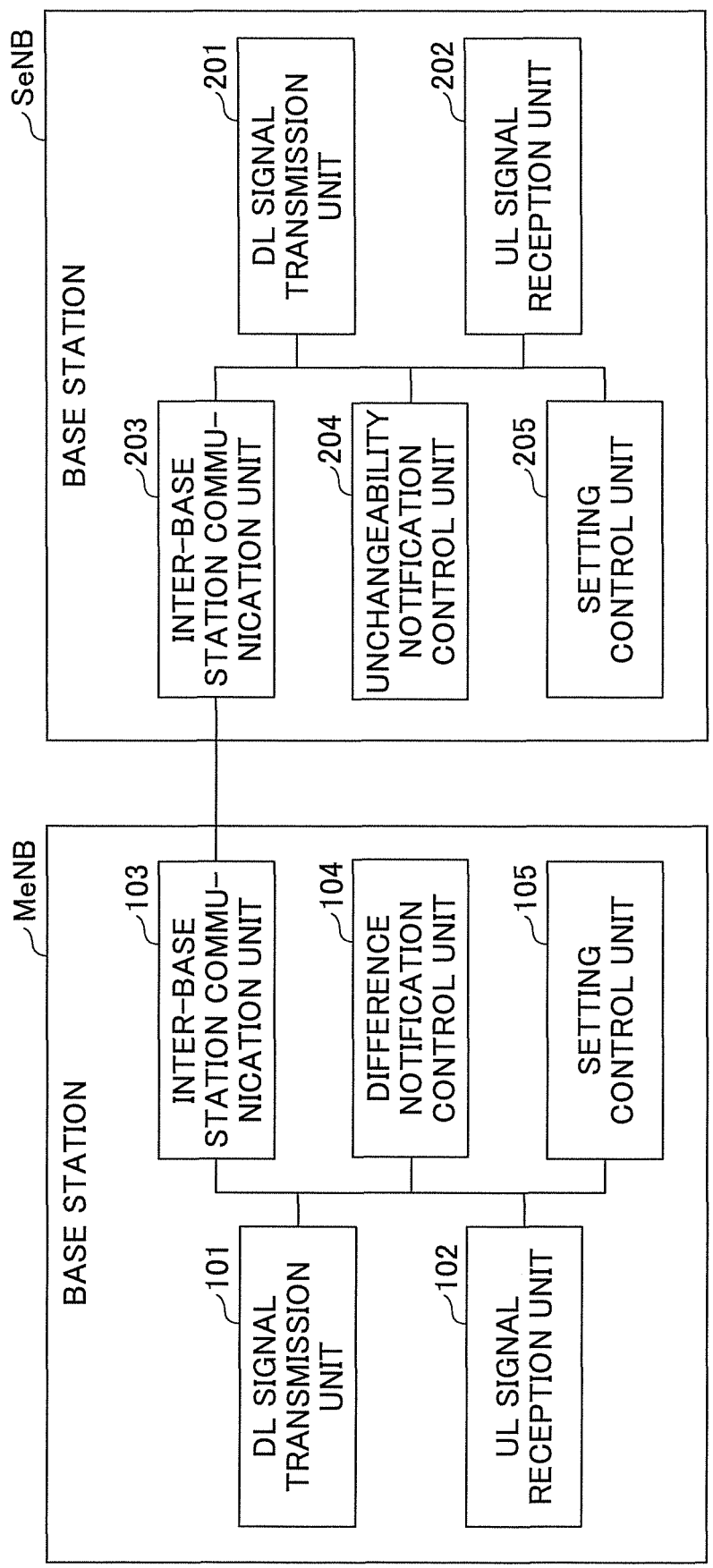

INFORMATION NOTIFICATION METHOD, MOBILE COMMUNICATION SYSTEM AND BASE STATION

TECHNICAL FIELD

The present invention relates to a notification technique of setting information (configuration) between base stations in a mobile communication system configured such that a user apparatus communicates with a plurality of base stations by inter-base station carrier aggregation.

BACKGROUND ART

In an LTE system, carrier aggregation (CA: carrier aggregation) for performing communication by simultaneously using a plurality of carriers is adopted, in which a predetermined bandwidth (20 MHz at the maximum) is used as a basic unit. In carrier aggregation, a carrier which is a basic unit is called a component carrier (CC: component carrier).

When CA is performed, a PCell (Primary cell) that is a reliable cell for ensuring connectivity and an SCell (Secondary cell) that is an appendant cell are set for the user apparatus UE. The user apparatus UE connects to a PCell first, and then, an SCell can be added as necessary. The PCell is a cell similar to an independent cell supporting RLM (Radio Link Monitoring) and SPS (Semi-Persistent Scheduling) and the like.

The SCell is a cell which is set to the user apparatus UE by being added to the PCell. Addition and deletion of an SCell can be performed by RRC (Radio Resource Control) signaling. Since the SCell is in an deactivated state right after it is set in the user apparatus UE, communication becomes available (scheduling becomes available) only by activating it.

As shown in FIG. 1, in CA up to Rel-10 of LTE, a plurality of CCs under the same base station eNB are used.

On the other hand, in Rel-12, this is further expanded so that Dual connectivity is proposed in which simultaneous communication is performed by using CCs under different base stations eNB to realize high throughput (non-patent document 1). That is, in Dual connectivity, the UE performs communication simultaneously using radio resources of two physically different base stations eNB.

Dual connectivity is a kind of CA, and it is also referred to as Inter-eNB CA (inter-base station carrier aggregation), in which Master-eNB (MeNB) and Secondary-eNB (SeNB) are introduced. FIG. 2 shows an example of Dual connectivity. In the example of FIG. 2, the MeNB communicates with the user apparatus UE by a CC#1, and the SeNB communicates with the user apparatus UE by a CC#2 so that Dual connectivity (to be referred to as DC hereinafter) is realized.

In DC, a cell group formed by cell(s) (one or a plurality of cells) under the MeNB is called an MCG (Master Cell Group), and a cell group formed by cell(s) (one or a plurality of cells) under the SeNB is called an SCG (Secondary Cell Group). An UL CC is set in at least one SCell in an SCG, and PUCCH is set in one of the at least one SCell. The SCell is called PSCell (primary SCell).

RELATED ART DOCUMENT

Non Patent Document

[NON PATENT DOCUMENT 1] 3GPP TR 36.842 V12.0.0 (2013-12)
[NON PATENT DOCUMENT 2] 3GPP TSG-RAN WG2 #87, R2-143417

SUMMARY OF THE INVENTION

Problem to be Solved by the Invention

When performing configuration changes of setting of DC and the like, a signaling flow shown in FIG. 3 is executed, for example. The configuration change here indicates overall configuration changes, such as addition of SeNB on DC, parameter change and the like, in which message transmission and reception occurs between an SeNB and an MeNB. Also, FIG. 3 shows a part of the signaling flow. An example of a signaling flow in DC related to FIG. 3 is described in the non-patent document 2.

In FIG. 3, for example, when the MeNB determines configuration change (example: SeNB addition), the MeNB transmits a configuration change request to the SeNB (step 1). The configuration change request includes a desired MCG configuration (target MCG config) that the MeNB desires to set to the user apparatus UE in the configuration change and UE capability that the MeNB receives from the user apparatus UE.

The SeNB that receives the configuration change request determines a desired SCG configuration (target SCG config) that the SeNB desires to set to the user apparatus UE based on the desired MCG configuration and the UE capability, so as to transmit an acknowledgement response including the desired SCG configuration to the MeNB (step 2).

The MeNB changes the desired MCG configuration and/ or the desired SCG configuration as necessary, and transmits, to the user apparatus UE, a configuration change instruction (example: RRC connection reconfiguration) including the determined MCG configuration and SCG configuration (step 3).

When the setting of the configuration change completes, the user apparatus UE returns a complete response (example: RRC connection reconfiguration complete) to the MeNB (step 4).

The MeNB that receives the complete response from the user apparatus UE transmits an acknowledgement response (confirmation message) to the SeNB (step 5). At this time, it is assumed that the MCG configuration and the SCG configuration that are finally set in the user apparatus UE are included in the acknowledgement information. The reason is that, for the SeNB to properly perform control (example: UL power control) for the UE, it is desirable that the SCG side ascertains not only the finally set configuration in the SCG side but also the configuration set in the MCG side.

However, at the stage of the step 2 of the sequence shown in FIG. 3, the SeNB ascertains the desired MCG configuration and the desired SCG configuration. Thus, if the final MCG configuration/SCG configuration are not changed from the desired MCG configuration/desired SCG configuration, the SeNB receives information that the SeNB already ascertains from the MeNB. Also, even when there is a change, unchanged parts that the SeNB already ascertains are notified.

That is, in the acknowledgement response from the MeNB to the SeNB in the configuration change procedure, since a configuration that is already ascertained by the SeNB and that is unnecessary to notify is notified. Thus, there is a problem in that overhead in the X2 interface increases.

The present invention is contrived in view of the above-mentioned points, and an object of the present invention is to provide a technique, in a mobile communication system including a first base station and a second base station that communicate with a user apparatus by inter-base station carrier aggregation, that can reduce an information amount of setting information on configuration change transmitted from the first base station to the second base station.

Means for Solving the Problem

According to an embodiment of the present invention, there is provided an information notification method in a mobile communication system including a first base station and a second base station that perform communication with a user apparatus by inter-base station carrier aggregation, including:

a step in which the first base station notifies the second base station of a configuration change request including first desired setting information;

a second desired setting information notification step in which the second base station notifies the first base station of second desired setting information;

a setting step in which the first base station determines first setting information and second setting information to be set to the user apparatus based on the first desired setting information and the second desired setting information, and notifies the user apparatus of the first setting information and the second setting information; and a difference notification step of, after completion of setting of the first setting information and the second setting information to the user apparatus, notifying the second base station of a difference of setting information between before and after the setting.

According to an embodiment of the present invention, there is provided a mobile communication system including a first base station and a second base station that perform communication with a user apparatus by inter-base station carrier aggregation, wherein, the first base station is configured to notify the second base station of a configuration change request including first desired setting information;

the second base station is configured to notify the first base station of second desired setting information;

the first base station is configured to determine first setting information and second setting information to be set to the user apparatus based on the first desired setting information and the second desired setting information, and to notify the user apparatus of the first setting information and the second setting information, and after completion of setting of the first setting information and the second setting information to the user apparatus, the first base station is configured to notify the second base station of a difference of setting information between before and after the setting.

According to an embodiment of the present invention, there is provided a base station used as a first base station in a mobile communication system including the first base station and a second base station that perform communication with a user apparatus by inter-base station carrier aggregation, including:

notification means configured to notify the second base station of a configuration change request including first desired setting information;

setting means configured to receive second desired setting information from the second base station, and to determine first setting information and second setting information to be set to the user apparatus based on the first desired setting information and the second desired setting information, and to notify the user apparatus of the first setting information and the second setting information; and difference notification means configured, after completion of setting of the first setting information and the second setting information to the user apparatus, to notify the second base station of a difference of setting information between before and after the setting.

According to an embodiment of the present invention, there is provided a base station used as a second base station in a mobile communication system including a first base station and the second base station that perform communication with a user apparatus by inter-base station carrier aggregation, including:

notification means configured to receive a configuration change request including first desired setting information from the first base station, and to notify the first base station of second desired setting information;

reception means configured, after the first base station determines first setting information and second setting information to be set to the user apparatus based on the first desired setting information and the second desired setting information and notifies the user apparatus of the first setting information and the second setting information, and setting of the first setting information and the second setting information to the user apparatus completes, to receive a difference of setting information between before and after the setting from the first base station.

Effect of the Present Invention

According to an embodiment of the present invention, it becomes possible, in a mobile communication system including a first base station and a second base station that communicate with a user apparatus by inter-base station carrier aggregation, to reduce an information amount of setting information on configuration change transmitted from the first base station to the second base station.

BRIEF DESCRIPTION OF THE DRAWINGS

FIG. 8 is a diagram showing a process procedure example in a modified example; and FIG. 9 is a block diagram of base stations in an embodiment of the present invention.

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. Although the present embodiments are targeted for a mobile communication system of LTE, the present invention can be applied not only to LTE but also to other mobile communication systems. Also, in the specification and the claims, the term "LTE" is used to mean Rel-12 of 3GPP, or schemes after Rel-12 unless otherwise stated.

(System Whole Configuration)

Figure 1:
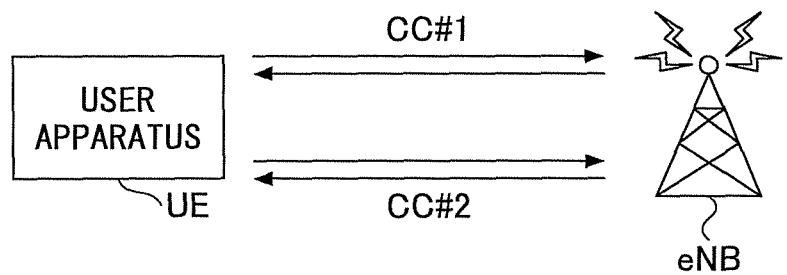
FIG. 1 is a diagram showing a CA up to Rel-10.
Figure 2:
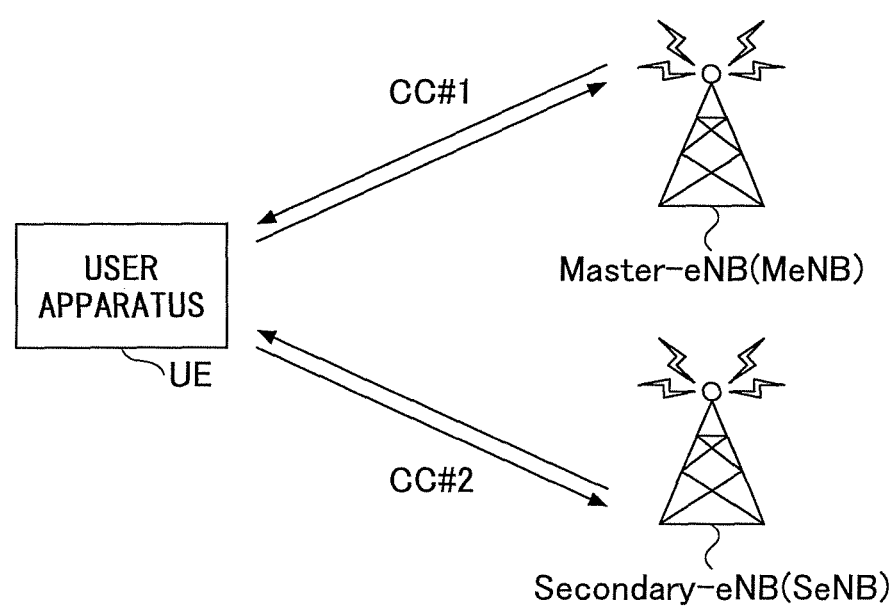
FIG. 2 is a diagram showing an example of Dual connectivity.
Figure 3:
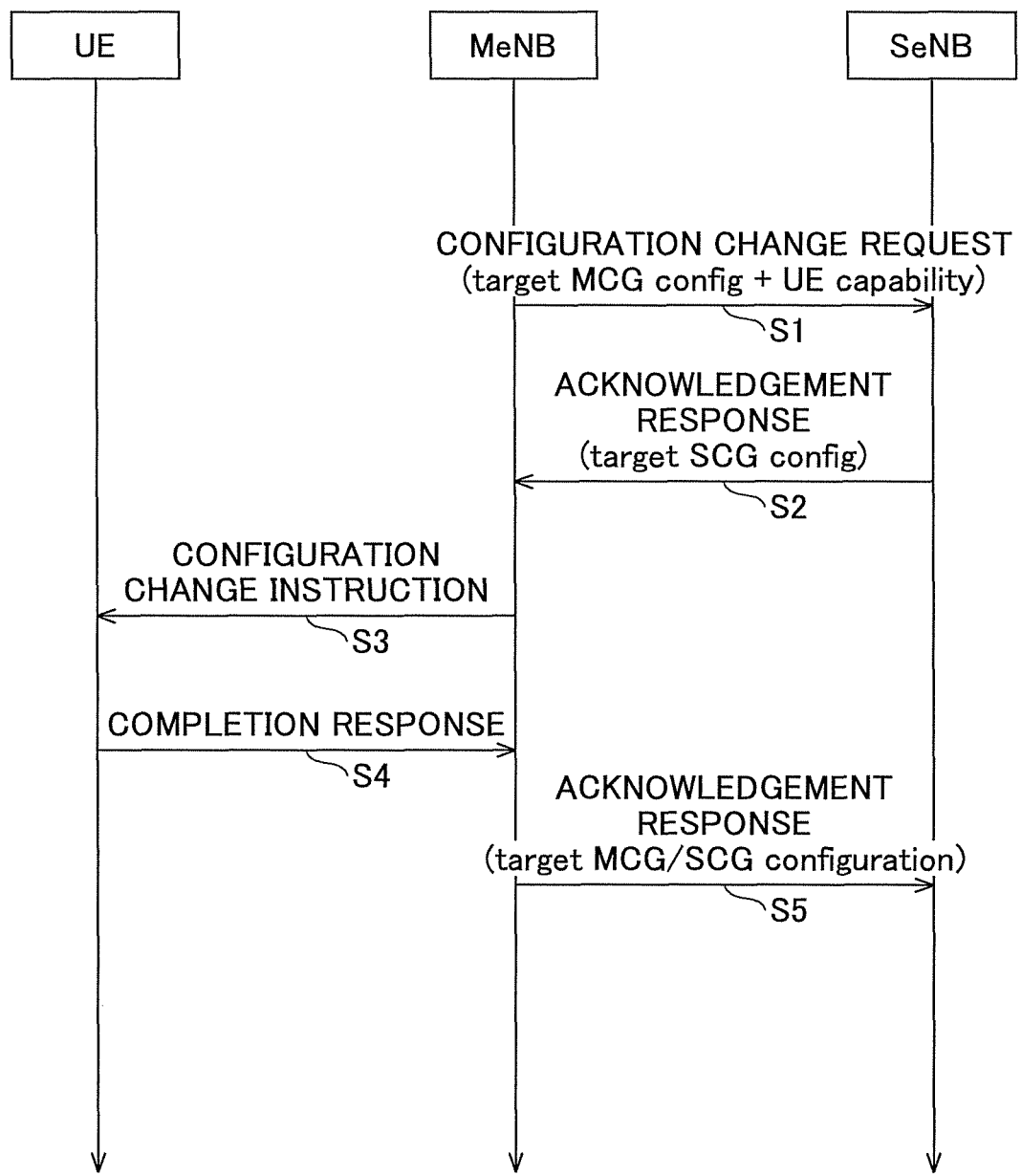
FIG. 3 is a diagram for explaining a problem.
Figure 4:
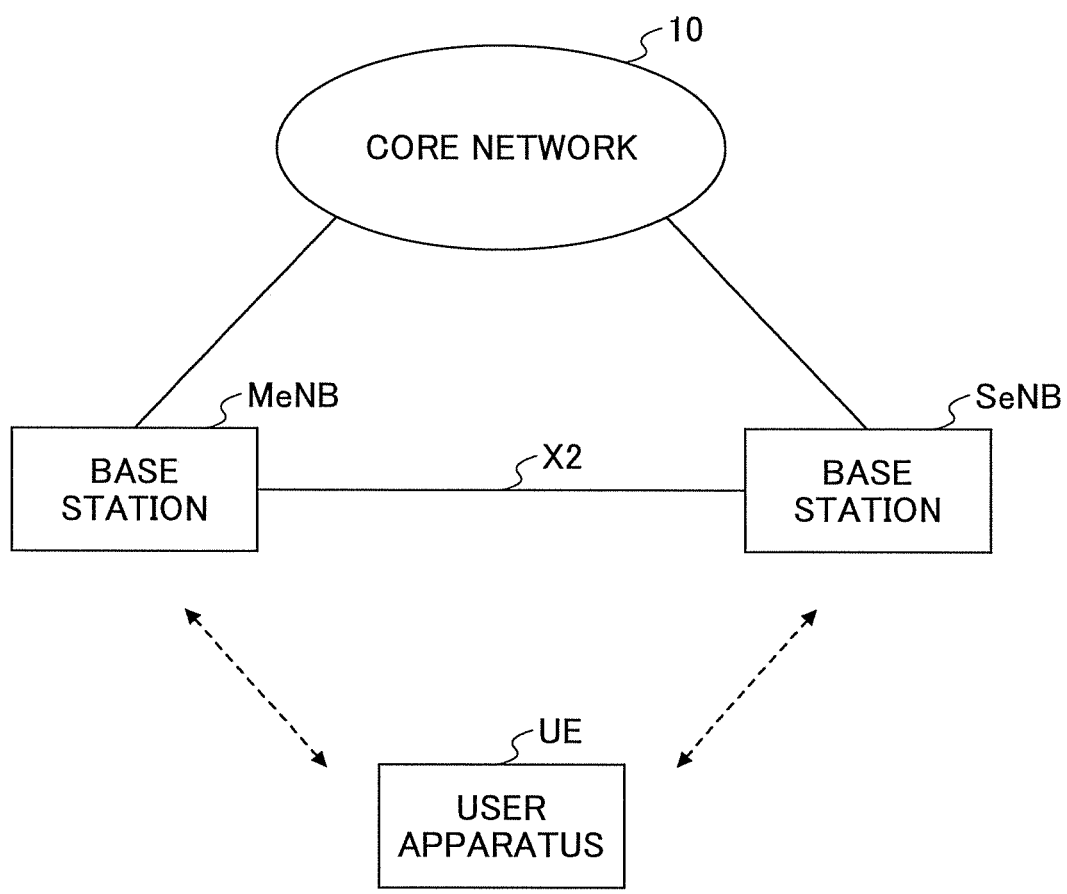
FIG. 4 is a block diagram of a communication system in an embodiment of the present invention.

FIG. 4 shows a configuration example of a communication system of an embodiment of the present invention. As shown in FIG. 4, the communication system includes a base station MeNB and a base station SeNB each connected to a core network 10, which enables DC between the base station MeNB and base station SeNB, and the user apparatus UE. Also, communication is available between the base station MeNB and the base station SeNB by an X2 interface. In the following, for the sake of simplicity of description, the base station MeNB and the base station SeNB are described as MeNB and SeNB respectively.

In the communication system shown in FIG. 4, for example, a PCell and an SCell (including PSCell) can be set by using an MCG as a macro cell and an SCG as a small cell. Addition, deletion, setting change and the like of an SeNB in the user apparatus UE is performed by an RRC signaling from the MeNB, but, it is not limited to this.

(Operation Example of the System)

Figure 5:
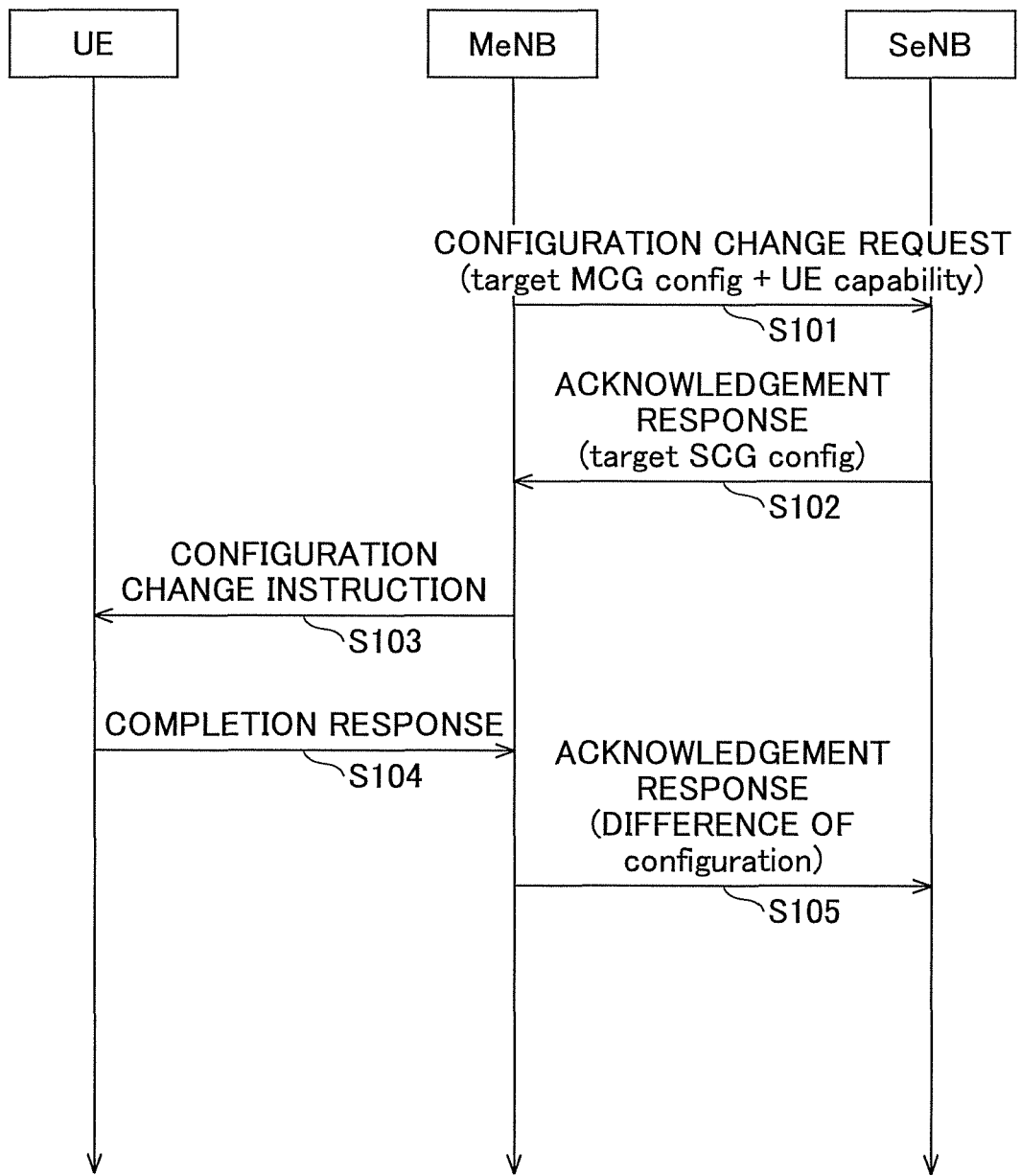
FIG. 5 is a diagram showing a process procedure in an embodiment of the present invention.

An operation example of the system in the present embodiment is described with reference to FIG. 5. FIG. 5 is an example of a signaling flow when performing configuration change such as setting or change of DC or the like. The configuration change here indicates overall configuration changes, such as SeNB addition, parameter change and the like on DC, in which message transmission and reception on configuration between the SeNB and the MeNB occurs.

When the MeNB determines configuration change (example: SeNB addition), the MeNB transmits a configuration change request to the SeNB (step 101). The configuration change request includes a desired MCG configuration (target MCG config) that the MeNB desires to set in the user apparatus UE in the configuration change and a UE capability that the MeNB receives from the user apparatus UE.

The SeNB that receives the configuration change request determines a desired SCG configuration (target SCG config) that the SeNB desires to set to the user apparatus UE in the configuration change in consideration of the desired MCG configuration and the UE capability so as to transmit an acknowledge response (ack) including the desired SCG configuration to the MeNB (step 102).

An example of determining a desired SCG configuration in consideration of the desired MCG configuration and the UE capability is as follows. When assuming that the upper limit of the total number of CCs of the MCG and the SCG that the user apparatus UE can set is 3 and that the MeNB sets 1 as the number of CCs in the desired MCG configuration, the SeNB determines the number of CCs considering 2 (3−1) as an upper limit.

The MeNB that receives an acknowledge response in step 102 changes the desired MCG configuration and/or the desired SCG configuration so as to transmit, to the user apparatus UE, a configuration change instruction (example: RRC connection reconfiguration) including the determined MCG configuration and the determined SCG configuration (step 103).

An example in a case where the desired configuration is changed is described. For example, in DC setting (SeNB addition), when the upper limit of the total number of CCs of the MCG and the SCG that the user apparatus UE can set is 3 and the MeNB sets 1 as the number of CCs in the desired MCG configuration, it is assumed that the SeNB sets 1 (a number smaller than the upper limit 2) as the number of CCs in the desired SCG configuration in consideration of congestion degree and the like.

At this time, the MeNB ascertains that the desired CC number of the SeNB is 1 by the acknowledgement response of step 102 so as to ascertain that the sum of this number and the number of CCs (1) of the MeNB is smaller than the UE capability value (=3). In a case where the MeNB performs configuration to the UE with a policy that the UE capability is utilized thoroughly as much as possible, it can be considered that the MeNB changes the original desired number of CCs from 1 to 2.

The user apparatus UE that receives the configuration change instruction in step 103 of FIG. 5 performs setting of configuration change in accordance with the received configuration information. After the setting of the configuration change completes, the user apparatus UE returns a complete response (example: RRC connection reconfiguration complete) to the MeNB (step 104).

The MeNB that receives the complete response from the user apparatus UE transmits an acknowledgement response (confirmation message) to the SeNB (step 105). At this time, in the present embodiment, the MeNB includes, in the acknowledgement response, only a difference between "the desired MCG configuration and the desired SCG configuration" and "the MCG configuration and the SCG configuration that are finally set in the user apparatus UE (that is, for which a complete response has been returned)".

That is, in the present embodiment, when the MeNB transmits a confirmation response (confirmation message) to the SeNB, overhead of X2 interface can be reduced by transmitting only a difference. Since the SeNB holds desired MCG/SCG configurations, the SeNB can ascertain MCG/SCG configurations in the UE after completion of setting by receiving the difference.

Figure 6:
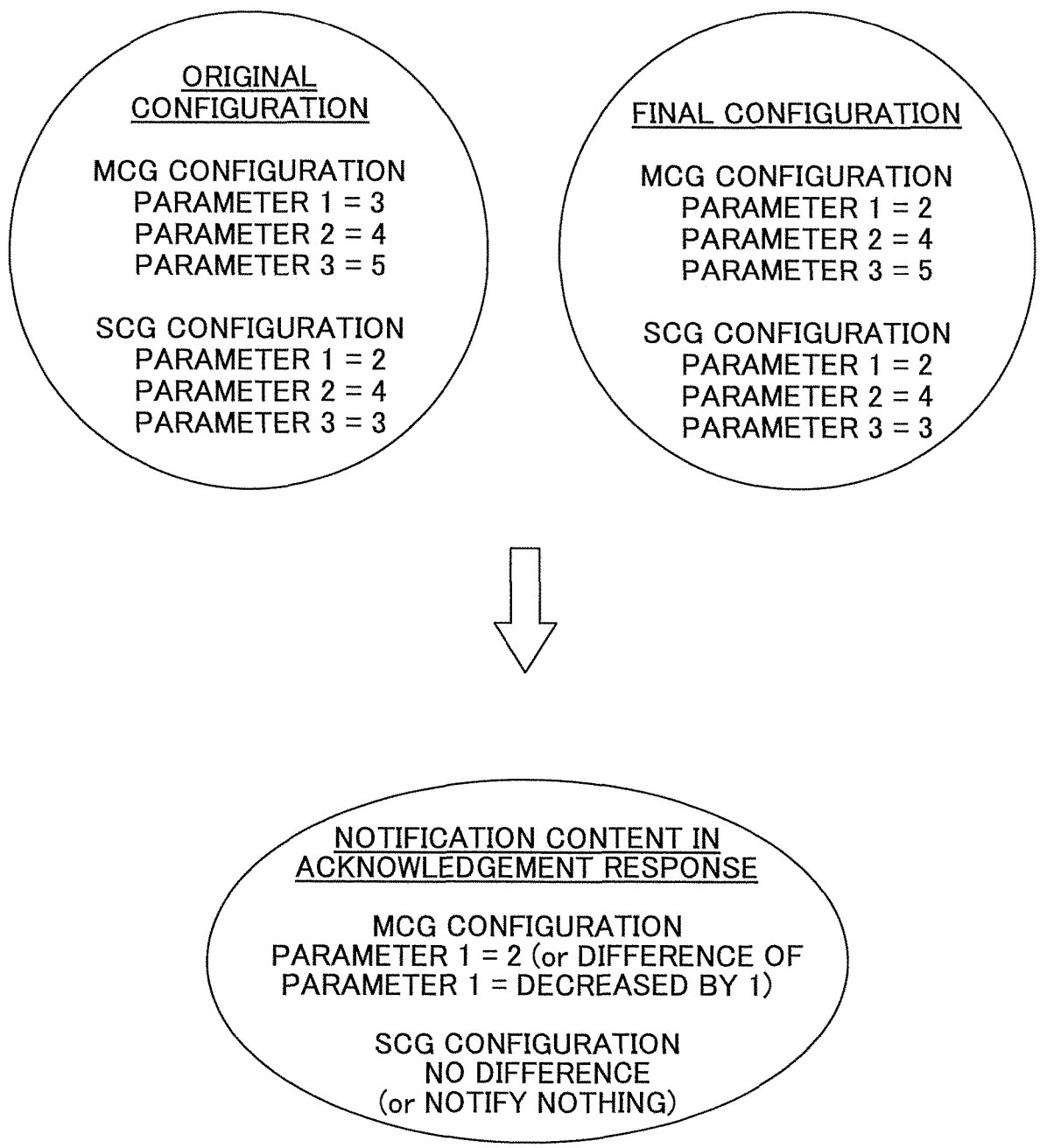
FIG. 6 is a diagram showing an example of a difference.

An example of a difference of the configuration notified by the acknowledgement response is described with reference to FIG. 6. As shown in FIG. 6, for example, it is assumed that the original MCG configuration that the MeNB desires is (parameter 1=3, parameter 2=4, parameter 3=5), and that the original SCG configuration that the SeNB desires is (parameter 1=2, parameter 2=4, parameter 3=3).

Then, it is assumed that the final MCG configuration, that is transmitted to the user apparatus UE, for which setting has completed is (parameter 1=2, parameter 2=4, parameter 3=5) and that the final SCG configuration, that is transmitted to the user apparatus UE, for which setting has completed is (parameter 1=2, parameter 2=4, parameter 3=3).

In this case, the difference between the original MCG configuration and SCG configuration, and the MCG configuration and the SCG configuration that are finally set to the user apparatus is only in the parameter 1 of the MCG configuration. Thus, as the acknowledgement response, only information on the parameter 1 of the MCG configuration is transmitted. The information may be the value of the finally set parameter 1 or may be a difference of the parameter 1 (in this case, information indicating that it is decreased by 1). In either case, the information is information of "a difference between the original MCG configuration and SCG configuration, and the MCG configuration and the SCG configuration that are finally set in the user apparatus UE".

Also, in the example of FIG. 6, as to the SCG configuration, since there is no difference between the original one and the final one, information indicating that there is no difference may be explicitly notified, or it may be implicitly notified that there is no difference by not notifying of anything on the SCG configuration.

Also, as to both of the MCG configuration and the SCG configuration, when there is no difference between the original one and the final one, it may be explicitly notified that there is no difference for both, or it may be implicitly notified that there is no difference by not notifying of anything on the difference.

An IE (Information Element) or a parameter for notifying of a difference when there is the difference may be restricted to a specific one. For example, in a case where it is assumed that the MeNB performs notification when there is a difference only for an IE-A, the MeNB notifies of the difference when there is a difference on the IE-A, but the MeNB does not notify of the difference when there is a difference in an IE other than the IE-A. In this case, when there is no notification, it means that it is implicitly notified that there is no difference on IE-A.

Also, in the case where a parameter for notifying of a difference is restricted to a specific one, the specific parameter(s) may be one or a plurality of or all of UL guaranteed power ($P_{MeNB}$, $P_{SeNB}$) in each Cell Group (eNB), the number of bits that the UE can transmit/receive in 1 TTI, and the number of DL/UL CCs that are set.

The reason for taking the above-mentioned parameters as the specific parameters is that, it is necessary that each of the MeNB and the SeNB ascertains the maximum transmission power (guaranteed power), the maximum scheduling bit number, and the number of configured CCs of each other eNB in order to perform scheduling so as not to exceed UE's capability and the maximum transmission power.

As to "a difference between the original MCG configuration and SCG configuration, and the MCG configuration and the SCG configuration that are finally set in the user apparatus UE" transmitted from the MeNB to the SeNB in the present embodiment, in the example of FIG. 6, "the original MCG configuration and SCG configuration" is desired configurations that the MeNB and the SeNB try to set to the UE, and "the MCG configuration and the SCG configuration that are finally set in the user apparatus UE" is configurations that are finally set to the UE in the desired configurations that the MeNB and the SeNB try to set to the UE.

The above-mentioned example is merely an example. As to "a difference between the original MCG configuration and SCG configuration, and the MCG configuration and the SCG configuration that are finally set in the user apparatus UE" transmitted from the MeNB to the SeNB in the present embodiment, "the original MCG configuration and SCG configuration" may be the whole configuration already set in the UE (configuration that is set in the UE right before step 103 of FIG. 5), and "the MCG configuration and the SCG configuration that are finally set in the user apparatus UE" may be the whole configuration set in the UE after configuration change (configuration that is set in the UE after step 103, 104 of FIG. 5). Also in this case, as to the notification method in a case where there is no difference, as to the method for restricting to a specific IE, a specific parameter, and the like, the same as methods described before applies.

(Concrete Example of Operation)

Figure 7:
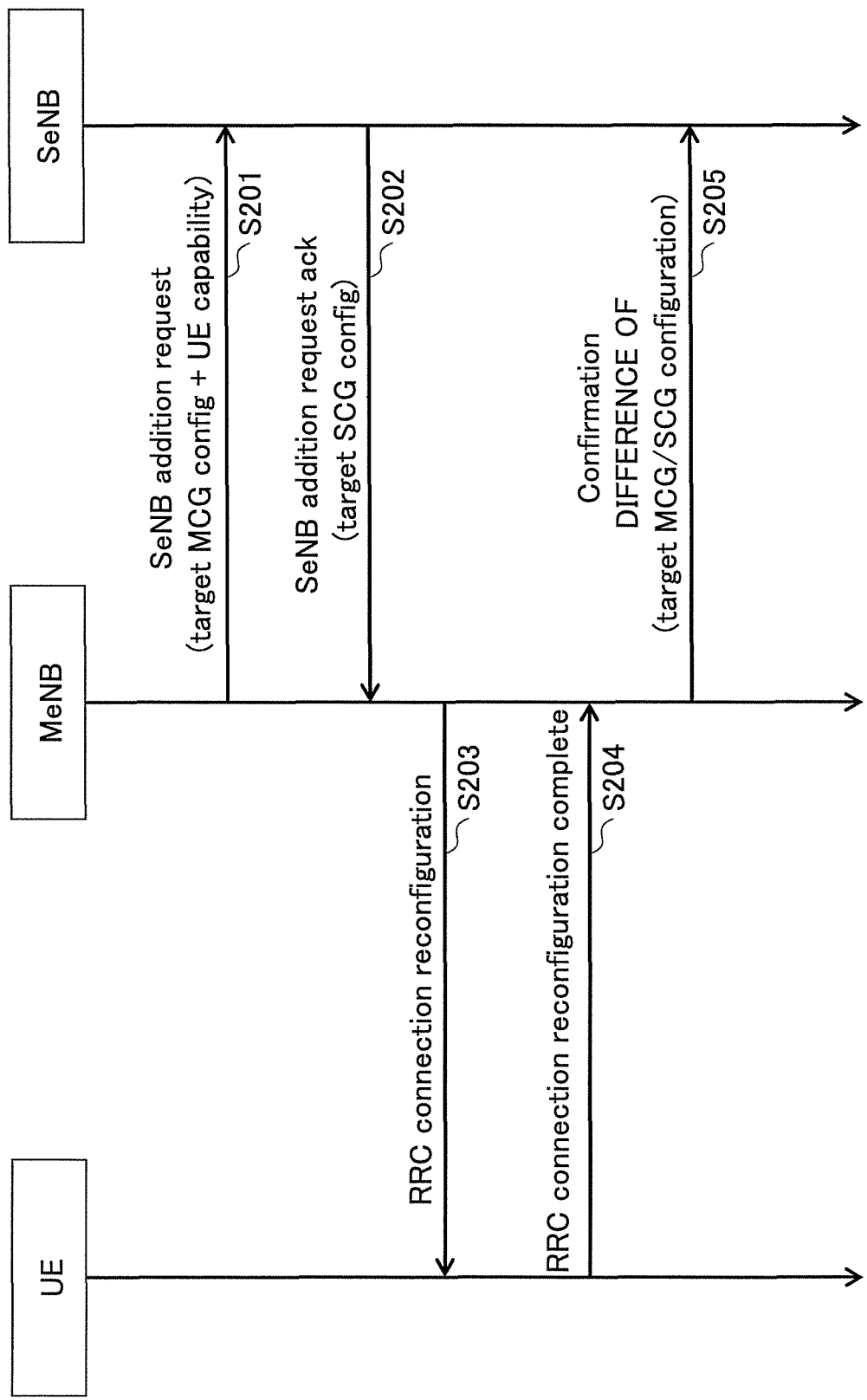
FIG. 7 is a diagram showing a concrete process procedure example.

FIG. 7 shows a sequence example in a case where the configuration change is SeNB addition (SeNB addition). FIG. 7 is a part of the whole sequence for SeNB addition.

When the MeNB determines to add the SeNB, the MeNB transmits an SeNB addition request to the SeNB (step 201). The SeNB addition request includes a desired MCG configuration (target MCG config), a UE capability (UE capability), and a measurement result of a cell under the SeNB.

The SeNB that receives the SeNB addition request considers the content of the request. If DC is available, the SeNB determines a desired SCG configuration (target SCG config) that the SeNB desires to set to the user apparatus UE so as to transmit, to the MeNB, an SeNB addition request ack (ack, hereinafter) including the desired SCG configuration (step 202).

The MeNB that receives the ack changes the desired MCG configuration and/or the desired SCG configuration as necessary so as to transmit, to the user apparatus UE, an RRC connection reconfiguration including the determined MCG configuration and SCG configuration (step 203).

The user apparatus UE that receives the RRC connection reconfiguration in step 203 performs RRC setting such as CC addition and the like according to the received configuration, and when the setting completes, the user apparatus UE transmits an RRC connection reconfiguration complete to the MeNB (step 204).

The MeNB that receives the RRC connection reconfiguration complete from the user apparatus UE transmits an acknowledgement response (confirmation message) to the SeNB (step 205). The confirmation message includes, as already described, for example, a difference between "the desired MCG configuration and the desired SCG configuration" and "the MCG configuration and the SCG configuration that are finally set to the user apparatus UE". When there is no difference, nothing is notified as a difference, for example.

In the example of FIG. 7, although SeNB addition is taken as an example of configuration change, configuration change is not limited to this. As configuration change in the present embodiment, other than the SeNB addition, there are, for example, SeNB modification, SeNB release, eNB change (Handover) and the like.

Modified Example

As described before, after step 102 of FIG. 5/step 202 of FIG. 7, the MeNB can change the MCG/SCG configuration as necessary. However, there is a possibility that the SeNB does not accept the MCG/SCG configuration that the MeNB changes. For example, like a parameter related to TPC, depending on the situation of a cell under the SeNB, in a case where performance cannot be exhibited unless a parameter that the SeNB decides and that is notified to the MeNB is used, if the parameter is changed for the worse for the SeNB, there is a possibility in that the SeNB does not accept the change of the parameter. When the SeNB does not accept the change of the parameter, further sequence occurs so that there is a possibility that overhead increases.

In order to avoid occurrence of such a case, when the SeNB returns the acknowledgement response (ack) to the MeNB in step 102 of FIG. 5/step 202 of FIG. 7, the SeNB may notify the MeNB not to change the SCG configuration that the SeNB desires.

A sequence example in this case is shown in FIG. 8. This sequence is for an example of SeNB addition like FIG. 7. Also, the modified example can be applied not only to SeNB addition, but also various configuration changes. The process content of steps 301-305 is the same as the process content of steps 201-205 in FIG. 7 except for points described below. In the following, processes different from processes described in FIG. 7 are described.

In the example of FIG. 8, right before step 302, the SeNB determines a desired SCG configuration, and determines that the SCG configuration is unchangeable. Then, the SeNB transmits an ack of step 302 to the MeNB by including the desired SCG configuration and information (indication) indicating that it is unchangeable. The information indicating that it is unchangeable may be an explicit indication or an implicit one by not explicitly including the indication.

The MeNB that receives the information transmits the RRC connection reconfiguration to the user apparatus UE without changing the SCG configuration (step 303).

After step 303 and step 304, in step 305, since the final SCG configuration set in the UE is not changed from the original SCG configuration, "no difference" on the SCG configuration is notified to the SeNB. As to control in the MeNB here, in the same way as FIG. 5 and FIG. 7, "no difference" may be determined by comparing the final SCG configuration and the original SCG configuration, or, "no difference" may be notified based on the indication of "unchangeable" in step 302 without performing actual comparison. Also, nothing on difference may be notified.

Also, the indication of "unchangeable" in step 302 may be targeted for the whole SCG configuration to be notified to the MeNB, or, the indication may be in units of IEs, or may be in units of parameters. In the case where it is in units of IE/parameter, in step 305, no difference is notified to the SeNB as for unchangeable IE/parameters.

(Configuration Example of Base Station MeNB, SeNB)

FIG. 9 shows a functional block diagram of the MeNB and the SeNB that can perform operations described so far. As shown in FIG. 9, the MeNB includes a DL signal transmission unit 101, an UL signal reception unit 102, an inter-base station communication unit 103, a difference notification control unit 104, and a setting control unit 105. The SeNB includes a DL signal transmission unit 201, an UL signal reception unit 202, an inter-base station communication unit 203, an unchangeability notification control unit 204, and a setting control unit 205. FIG. 9 only shows functional units especially related to the embodiment of the present invention in the MeNB and the SeNB, and each of the MeNB and the SeNB also includes at least functions, not shown in the figure, for performing as a base station in a mobile communication system complying with LTE. Also, the functional configuration shown in FIG. 9 is merely an example. Any function segmentations and any names of functional units can be used as long as the base station can execute operation described in the present embodiment.

The DL signal transmission unit 101 (same applies to 201) includes a function configured to generate various signals of physical layer from an upper layer signal that should be transmitted from the base station so as to transmit the various signals by radio. The UL signal reception unit 102 (same applies to 202) includes a function configured to receive various signals from the user apparatus UE by radio so as to obtain an upper layer signal from the received physical layer signal.

The inter-base station communication unit 103 (same applies to 203) performs communication between base stations by an X2 interface. The setting control unit 105 (same applies to 205) performs processes of various setting/change/management and the like in RRC (radio resource control) and the like. These processes include configuration change processing including SeNB addition and the like. That is, the processes in the sequence shown in FIG. 5, FIG. 7, FIG. 8 and the like are basically performed by the setting control unit 105 (205).

When the MeNB notifies the SeNB of an acknowledge response (confirmation), the difference notification control unit 104 determines a difference of MCG/SCG configuration between before and after the setting and performs processing for notifying of the difference (or no difference) by including it in the acknowledgement response, as described in step 105 of FIG. 5/step 205 of FIG. 7/step 305 of FIG. 8 and the like. In the SeNB side that receives the difference, the setting control unit 205 ascertains the finally set MCG/SCG configuration based on the difference.

As described in the modified example, when the SeNB (setting control unit 205) determines a desired SCG configuration when performing configuration change, the unchangeability notification control unit 204 determines whether the SCG configuration (the whole configuration, in units of IE, or in units of parameter) is unchangeable, and when it is unchangeable, the unchangeability notification control unit 204 includes information indicating that the SCG configuration is unchangeable and the SCG configuration in an ack so as to transmit the ack to the MeNB.

In the MeNB that receives "unchangeable", the setting control unit 105 determines the final MCG/SCG configuration by not changing the SCG configuration so as to set the final MCG/SCG configuration to the user apparatus UE. The base station of the present embodiment may be configured as follows.

That is, the base station of the present invention is a base station used as a first base station in a mobile communication system including the first base station and a second base station that perform communication with a user apparatus by inter-base station carrier aggregation, including:

a notification unit configured to notify the second base station of a configuration change request including first desired setting information;

a setting unit configured to receive second desired setting information from the second base station, and to determine first setting information (configuration) and second setting information (configuration) to be set to the user apparatus based on the first desired setting information and the second desired setting information, and to notify the user apparatus of the first setting information and the second setting information; and a difference notification unit configured, after completion of setting (configure) of the first setting information and the second setting information to the user apparatus, to notify the second base station of a difference of setting information between before and after the setting.

Also, the base station of the present invention is a base station used as a second base station in a mobile communication system including a first base station and the second base station that perform communication with a user apparatus by inter-base station carrier aggregation, including:

a notification unit configured to receive a configuration change request including first desired setting information from the first base station, and to notify the first base station of second desired setting information; and a reception unit configured, after the first base station determines first setting information and second setting information to be set to the user apparatus based on the first desired setting information and the second desired setting information and notifies the user apparatus of the first setting information and the second setting information, and setting of the first setting information and the second setting information to the user apparatus completes, to receive a difference of setting information between before and after the setting from the first base station.

SUMMARY OF THE EMBODIMENT

As described above, according to the present embodiment, there is provided an information notification method in a mobile communication system including a first base station and a second base station that perform communication with a user apparatus by inter-base station carrier aggregation, including:

a step in which the first base station notifies the second base station of a configuration change request including first desired setting information;

a second desired setting information notification step in which the second base station notifies the first base station of second desired setting information;

a setting step in which the first base station determines first setting information and second setting information to be set to the user apparatus based on the first desired setting information and the second desired setting information, and notifies the user apparatus of the first setting information and the second setting information; and a difference notification step of, after completion of setting of the first setting information and the second setting information to the user apparatus, notifying the second base station of a difference of setting information between before and after the setting.

According to this information notification method, it becomes possible, in a mobile communication system including a first base station and a second base station that communicate with a user apparatus by inter-base station carrier aggregation, to reduce an information amount of setting information on configuration change transmitted from the first base station to the second base station.

In the difference notification step, when there is a difference between the first setting information and the second setting information for which setting to the user apparatus has completed, and the first desired setting information and the second desired setting information, the first base station may notify the second base station of the difference. According to this configuration, the second base station can ascertain a difference on setting information to be set when performing configuration change.

In the difference notification step, when there is a difference between setting information set in the user apparatus after the setting to the user apparatus completes and setting information set in the user apparatus before the setting to the user apparatus, the first base station may notify the second base station of the difference. According to this configuration, the second base station can ascertain a difference on the whole setting information of the user apparatus between before and after performing configuration change.

In the difference notification step, when there is not the difference, the first base station may notify the second base station of information indicating that there is no difference or of nothing as the difference. According to this configuration, when there is no difference, an information amount to transmit can be largely decreased.

In the difference notification step, the first base station may notify the second base station of the difference for a specific information element in setting information or for a specific parameter in setting information. By restricting information for which difference is notified in this way, the information amount reduction effect can be increased.

In the second desired setting information notification step, the second base station may notify the first base station, explicitly or implicitly, that the second desired setting information is unchangeable. According to this configuration, for example, it can be prevented that a case where the second base station does not accept a change of the second desired setting information occurs.

Each base station (MeNB, SeNB) described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, the embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the base station have been explained by using a functional block diagram. However, such an apparatus may be implemented in hardware (example: circuit), software, or a combination thereof.

Each of the software executed by a processor provided in the user apparatus according to an embodiment of the present invention and the software executed by a processor provided in the base station may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2014-205020, filed in the JPO on Oct. 3, 2014, and the entire contents of the Japanese patent application No. 2014-205020 are incorporated herein by reference.

DESCRIPTION OF REFERENCE SIGNS

MeNB, SeNB base station
UE user apparatus
10 core network
101 DL signal transmission unit
102 UL signal reception unit
103 inter-base station communication unit
104 difference notification control unit
105 setting control unit
201 DL signal transmission unit
202 UL signal reception unit
203 inter-base station communication unit
204 unchangeability notification control unit
205 setting control unit

The invention claimed is:

1. An information notification method in a mobile communication system including a first base station and a second base station that perform communication with a user apparatus by inter-base station carrier aggregation, comprising:
   a step in which the first base station notifies the second base station of a configuration change request including first desired setting information;
   a second desired setting information notification step in which the second base station notifies the first base station of second desired setting information;
   a setting step in which the first base station determines first setting information and second setting information to be set to the user apparatus based on the first desired setting information and the second desired setting information, and notifies the user apparatus of the first setting information and the second setting information; and
   a difference notification step of, after completion of setting of the first setting information and the second setting information to the user apparatus, notifying the second base station of a difference between the first and second desired setting information before the setting step and the first and second setting information after the setting step.

2. A mobile communication system including a first base station and a second base station that perform communication with a user apparatus by inter-base station carrier aggregation, wherein,
   the first base station is configured to notify the second base station of a configuration change request including first desired setting information;
   the second base station is configured to notify the first base station of second desired setting information;
   the first base station is configured to determine first setting information and second setting information to be set to the user apparatus based on the first desired setting information and the second desired setting information, and to notify the user apparatus of the first setting information and the second setting information, and
   after completion of setting of the first setting information and the second setting information to the user apparatus, the first base station is configured to notify the second base station of a difference between the first and second desired setting information before the first and second setting information is notified and the first and second setting information after the first and second setting information is notified.

3. A base station used as a first base station in a mobile communication system including the first base station and a second base station that perform communication with a user apparatus by inter-base station carrier aggregation, comprising:
   a processor coupled to a memory, the processor configured to notify the second base station of a configuration change request including first desired setting information;
   the processor configured to receive second desired setting information from the second base station, and to determine first setting information and second setting information to be set to the user apparatus based on the first desired setting information and the second desired setting information, and to notify the user apparatus of the first setting information and the second setting information; and
   the processor configured, after completion of setting of the first setting information and the second setting information to the user apparatus, to notify the second base station of a difference between the first and second desired setting information before the first and second setting information is notified and the first and second setting information after the first and second setting information is notified.

4. A base station used as a second base station in a mobile communication system including a first base station and the second base station that perform communication with a user apparatus by inter-base station carrier aggregation, comprising:
   a processor coupled to a memory, the processor configured to receive a configuration change request including first desired setting information from the first base station, and to notify the first base station of second desired setting information; and
   the processor configured, after the first base station determines first setting information and second setting information to be set to the user apparatus based on the first desired setting information and the second desired setting information and notifies the user apparatus of the first setting information and the second setting information, and setting of the first setting information and the second setting information to the user apparatus completes, to receive a difference between the first and second desired setting information before the first and second setting information is notified and the first and second setting information after the first and second setting information is notified.

* * * * *